United States Patent Office 3,378,344
Patented Apr. 16, 1968

3,378,344
HYDROGEN COMPOUNDS OF ELEMENTS OF THE THIRD AND FOURTH MAIN GROUP OF THE PERIODIC SYSTEM AND ORGANO-SUBSTITUTED DERIVATIVES THEREOF
Elmar-Manfred Horn, Aachen, Karl John, Leichlingen, and Konrad Lang, Cologne-Stammheim, Germany, assignors to Farbenfabriken Bayer Aktiengesellschaft, Leverkusen, Germany, a German corporation
No Drawing. Filed June 18, 1964, Ser. No. 376,273
Claims priority, application Germany, July 2, 1963, F 40,133
10 Claims. (Cl. 23—204)

ABSTRACT OF THE DISCLOSURE

Production of hydrogen compounds of the general formula $MeH_nR_m$ in which Me is silicon, boron or aluminum, R is a hydrocarbon or halogen-substituted hydrocarbon, $n$ is an integer from 1 to 4 and $m$ is an integer from 0 to 3, such that $m+n$ is an integer from 3 to 4, by heating at a temperature between about 50–400° C., preferably 200–400° C., the corresponding halogen-substituted derivative of said compound with an alkali metal hydride in the presence of a catalyst which comprises an alkylmercapto borane of the general formula $H_nB(SR')_{3-n}$ in which R' is an alkyl radical having from 1 to 18 carbon atoms, preferably 1 to 12 carbon atoms, and $n$ is an integer from 0 to 2, the catalyst preferably being used in an amount of 0.1 to 20 mol percent, based upon the alkali metal hydride used, and the alkali metal hydride preferably being sodium hydride, with the reaction being performed optionally in an inert suspending agent.

---

The present invention relates to a process for the production of optionally organo-substituted hydrogen compounds of elements of the third and fourth main group of the Periodic System by reacting alkali metal hydrides with halogen compounds or organo-substituted halogen compounds of said elements.

Hydrogen compounds of elements of the third and fourth main group of the Periodic System are technically important products. They are applied as reducing agents, fuel and propellants. Furthermore, the above mentioned hydrides are valuable starting and intermediate products for the production of polymers.

From Ind. Eng. Chem. 51 (1959), pp. 665–668 it is known that organo-substituted chlorosilanes can be hydrogenated with suspensions of sodium hydride at 200–250° C. to the corresponding hydrogen compounds. However, only about 60% of the sodium hydride employed are reacted, even at the highest temperatures applied. A better utilization of the sodium hydride is achieved by the use of boron or aluminium alkyls or boric acid esters, which are applied in stoichiometric or catalytic quantities, referred to sodium hydride (cf. German published patent specifications Nos. 1,034,159; 1,038,553; 1,046,578; 1,-049,835; German patent specification No. 1,055,511, German published patent specifications Nos. 1,061,302 and 1,117,090).

According to German patent specification No. 1,055,511 the reaction of organo-substituted halogenosilanes with sodium hydride yields 83.2% organo-substituted silanes in the presence of catalytic quantities of aluminum triethyl and 58.5 to 76.8% in the presence of catalytic amounts of triethyl boron, said yields referring to the amount of sodium hydride employed. The use of these catalysts, however, involves difficulties, since boron or aluminum alkyls are spontaneously inflammable in air, have in part, an alkylating action at the required reaction temperatures and decompose with the formation of alkenes and other volatile compounds. The separation of decomposition products of e.g. organo-substituted silanes or silane results in additional difficulties, as follows from German published patent specification 1,044,781. Boric acid esters are less suitable as catalysts, since they are less active and, in addition, there may be obtained boron hydrides as byproducts as a consequence of the intermediary formation of sodium boranate.

It is an object of the present invention to provide a novel and highly economic process for the production of optionally organo-substituted hydrogen compounds of elements of the third and fourth main group of the Periodic System.

It is a further object of the present invention to provide a process for the production of optionally organo-substituted hydrogen compounds of the third and fourth main group of the Periodic System in the presence of catalysts, which are highly effective and well obtainable.

Still further objects and features will become apparent as the following description proceeds.

The present invention is concerned with a process for the production of optionally organo-substituted hydrogen compounds of elements of the third and fourth main group of the Periodic System of the elements by the reaction of optionally organo-substituted halogen compounds of said elements with an alkali metal hydride in the presence of a catalyst, characterized in that an alkylmercapto borane of the general formula $$H_nB(SR')_{3-n}$$

is used, wherein R' represents equal or different alkyl radicals and $n$ is 0, 1 or 2.

It has been found particularly advantageous to use tris-(alkylmercapto)-boranes of the general formula

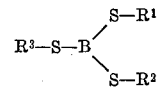

and bis-(alkylmercapto)-boranes of the general formula

$R^1$, $R^2$ and $R^3$ may be equal or different, alkyl radicals with straight or branched chains, having from 1 to 18 C-atoms, such as propyl, butyl, amyl, hexyl, heptyl, octyl, nonyl, decyl, undecyl, dodecyl or stearyl radicals. Particularly suitable catalysts are alkylmercapto boranes with larger alkyl radicals, which are derived from higher aliphatic mercaptans with 6 to 12 carbon atoms. The catalysts according to the invention may be produced, in a simple manner and in very good yield by the reaction of borazanes with mercaptans according to German patent specification 1,092,463.

The catalysts are preferably used in quantities of 0.1–20 molar percent, calculated with reference to the quantity of sodium hydride employed. By applying these practically odourless compounds as catalysts the difficulties of the process mentioned above are avoided. The catalysts, according to the present invention, can be used, without the formation of volatile decomposition products, at reaction temperatures of more than 200° C. and thus avoid the complicated purification of the hydrides obtained. The yields are at about 95–98% of the theoretical referred to the alkali metal hydride used. A further advantage of the use of alkylmercapto boranes as catalysts consists in that they are not spontaneously inflammable and hardly inflammable at all, and can therefore be handled easily and without danger.

For the process according to the invention, chlorine compounds of elements of the third and fourth main group are preferably used as starting products; however, it is also possible to use the corresponding fluorides, bromides and iodides for the reaction according to the invention.

The process according to the invention can also be carried out with such compounds which contain, in addition to halogen, one, two or three organic radicals. These organic radicals may be optionally halogen-substituted hydrocarbons, which do not react with alkali metal hydrides, such as linear or branched alkyl radicals with 1–12 carbon atoms, preferably with 1–3 carbon atoms, cycloalkyl radicals and/or aryl radicals, preferably phenyl radicals and fluorine- or chlorine-substituted derivatives of said radicals. According to the process of invention preferably the hydrogen compounds or the organo-substituted derivatives thereof of boron, aluminum and silicon can be obtained. With very good yields $BCl_3$, $AlCl_3$, $SiCl_4$ or the organo-substituted derivatives thereof with at least one chlorine atom can be used as starting materials.

Preferably sodium hydride is applied as alkali metal hydride for reason of economy, however the other alkali metal hydrides can be used, too.

The process according to the invention is carried out above 50° C., preferably at temperatures of about 200–400° C. with a thorough mixing in an inert suspending agent for alkali metal hydrides, such as mepasin, paraffin or mineral oils, advantageously while slowly passing through an inert gas.

In a preferred embodiment of this process the compound to be hydrogenated is added to a suspension containing sodium hydride and the catalyst.

The present process represents a technical advance in so far as, by the application of the catalysts according to the invention, a practically quantitative reaction of the sodium hydride or other alkali metal hydrides used is achieved leading to better yields than those obtained by known methods, furthermore the handling of the catalysts used in this process is considerably less dangerous and simpler.

The following examples are given for the purpose of illustrating the present invention.

Example 1

In a reaction vessel provided with a strong stirrer, immersion thermometer, dropping funnel which is connected with an inlet tube reaching to the bottom of the vessel and a gas outlet tube to which cooling traps are attached, 260 g. of a 18.8% NaH-suspension in mepasin are diluted with 600 g. of mepasin and, after the addition of 31 g. of tris-(dodecylmercapto)-borane, heated to 234–239° C. While maintaining this temperature, 100 g. of methyltrichlorosilane are introduced into the suspension with thorough mixing and passing in an inert gas, and the methyl silane formed is condensed in the attached cooling traps. The yield of pure methyl silane amounts to 77.3%.

Example 2

973 g. of a 3.9% NaH-suspension in mepasin and 24 g. of tris-(dodecylmercapto)-borane are reacted at 245–250° C. with 168 g. of trimethylchloro-silane in analogy to Example 1, and trimethyl silane which is free from chlorine and boron, is obtained in a yield of 84.5%.

Example 3

In analogy to Example 1, 585 g. of a 17.8% NaH-suspension in mepasin and 44.9 g. of bis-(dodecylmercapto)-borane, diluted with 455 g. of mepasin are reacted at 235–245° C. with 258 g. of dimethyldichloro-silane, whereby pure dimethyl silane is obtained in a 93% yield.

Example 4

By the reaction at 230–235° C. of 700 g. of a 17.9% NaH-suspension, diluted with 380 g. of mepasin, and 32 g. of tris-(dodecylmercapto)-borane with 337 g. of dimethyldichloro-silane in analogy to Example 1, dimethyl silane is obtained in a yield of 93%.

Example 5

$$4NaH + BF_3C_4H_8O \rightarrow NaBH_4 + 3NaF + C_4H_8O$$

As described in Example 1, 70.5 of boron trifluoride-tetrahydrofuran are added dropwise at 238–240° C. with thorough mixing of the suspension, to 255 g. of a 18.9% NaH-suspension, diluted with 530 g. of mepasin, and 31 g. of tris-(dodecylmercapto)-borane, and the tetrahydrofuran formed in the reaction is continuously drawn off. The mixture of sodium borohydride and sodium fluoride obtained by this reaction contains 18.2 g. of sodium borohydride, corresponding to a yield of 96.4% of the theoretical.

We claim:

1. In the process for the production of hydrogen compounds of the general formula $$MeH_nR_m$$

wherein Me is a member selected from the group consisting of silicon, boron and aluminum and R is a member selected from the group consisting of hydrocarbons and halogen-substituted hydrocarbons, $n$ is an integer selected from the group consisting of 4, 3, 2 and 1, $m$ is an integer selected from the group consisting of 3, 2, 1 and 0, whereby $m+n$ stands for an integer selected from the group consisting of 3 and 4, by heating the corresponding halogen-substituted derivative of said compond with an alkali metal hydride in the presence of a catalyst, the improvement which comprises using an alkylmercapto borane of the general formula $$H_nB(SR')_{3-n}$$

wherein R' is an alkyl radical having from 1 to 18 carbon atoms and $n$ is an integer selected from the group consisting of 0, 1 and 2, as catalyst, at a temperature between about 50 and 400° C.

2. Improvement according to claim 1, wherein sodium hydride is used as alkali metal hydride.

3. Improvement according to claim 1, wherein tris-(dodecylmercapto)-borane is used as catalyst.

4. Improvement according to claim 1, wherein bis-(dodecylmercapto)-borane is used as catalyst.

5. Improvement according to claim 1, wherein the catalyst is used in an amount of 0.1 to 20 mole percent, referred to the alkali metal hydride used.

6. Improvement according to claim 1, wherein the reaction is performed in an inert suspending agent.

7. Improvement according to claim 1 wherein each R respectively is selected from the group consisting of an alkyl radical having from 1 to 12 carbon atoms, a cycloalkyl radical, an aryl radical, a halogen-substituted alkyl radical, a halogen-substituted cyclolkyl radical, and a halogen-substituted aryl radical, and wherein R' is an alkyl radical having from 1 to 12 carbon atoms.

8. Improvement according to claim 1 wherein said temperature is between about 200–400° C.

9. Improvement according to claim 8 wherein a boron compound selected from the group consisting of boron-trihalide and an addition product of a borontrihalide with an ether is reacted with said alkali metal hydride in the presence of said catalyst at said temperature between about 200–400° C. to form $BH_3$ as an addition compound with one mol of alkali metal hydride per mol of $BH_3$.

10. Improvement according to claim 8 wherein said halogen-substituted derivative of said hydrogen compound is selected from the group consisting of $BCl_3$, $AlCl_3$, $SiCl_4$, methyltrichlorosilane, trimethylchlorosilane, dimethyldichlorosilane, and borontrifluoride-tetrahydrofuran.

References Cited

UNITED STATES PATENTS

| 3,043,857 | 7/1962 | Jenkner | 260—429.7 |
| 3,047,358 | 7/1962 | Jenkner | 23—362 |

FOREIGN PATENTS

| 1,092,463 | 4/1961 | Germany. |

MILTON WEISSMAN, *Primary Examiner.*